United States Patent
Arrendiell et al.

[11] Patent Number: 5,153,969
[45] Date of Patent: Oct. 13, 1992

[54] CORD CLASP

[76] Inventors: Robert W. Arrendiell; Gwendolyn G. Ellis, both of 280 Sugarberry Cir., Houston, Tex. 77024

[21] Appl. No.: 821,975

[22] Filed: Jan. 16, 1992

[51] Int. Cl.⁵ ............................................. A44B 21/00
[52] U.S. Cl. ...................................... 24/499; 24/16 R; 24/501; 24/511
[58] Field of Search ................ 24/16 R, 499, 500, 501, 24/508, 509, 510, 511, 535

[56] References Cited

U.S. PATENT DOCUMENTS

| | | | |
|---|---|---|---|
| 363,533 | 5/1887 | Munger | 24/511 |
| 537,955 | 4/1895 | Adams | 24/499 |
| 1,464,374 | 8/1923 | Vestine | 24/511 |
| 1,474,102 | 11/1923 | Ashmore | 24/511 |
| 1,891,494 | 12/1932 | Baltzley | 24/501 |
| 3,111,129 | 11/1963 | Dekel | 24/499 |
| 3,597,813 | 8/1971 | Takahashi | 24/499 |
| 3,999,259 | 12/1976 | Paajanen | 24/508 |
| 4,742,429 | 5/1988 | Arrendiell et al. | 361/391 |
| 5,052,086 | 10/1991 | Nasuno | 24/511 |

FOREIGN PATENT DOCUMENTS

| | | | |
|---|---|---|---|
| 0056040 | 4/1939 | Denmark | 24/508 |
| 0034603 | 10/1965 | Finland | 24/508 |
| 0016600 | 2/1913 | France | 24/499 |
| 0009305 | of 1898 | United Kingdom | 24/508 |

*Primary Examiner*—Victor N. Sakran
*Attorney, Agent, or Firm*—Vaden, Eickenroht, Thompson, Boulware & Feather

[57] ABSTRACT

A cord clasp is disclosed for holding together several loops or folds of an appliance cord in order to keep the cord tidy. The clasp includes two complementary facing jaw members, each having a cord surrounding portion and a handle portion separated by a pivoting ridge. A coil spring or other bias means keep the jaws or cord surrounding portions together. The jaw members are quite wide and taper to a gentle point to one side. The cord surrounding surfaces are generally curvilinear and can be more rounded in the vicinity of the points than otherwise, the roundness encouraging the cords to be grasped or held even though the cords may not come fully together when several thicknesses of cords are enclosed within the clasp.

7 Claims, 1 Drawing Sheet

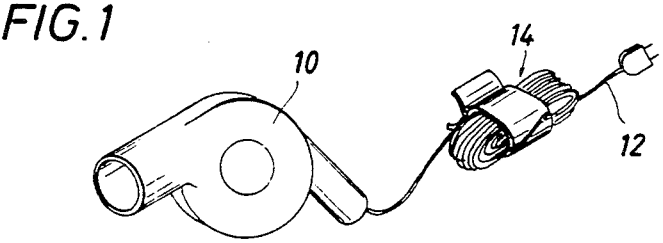
FIG.1
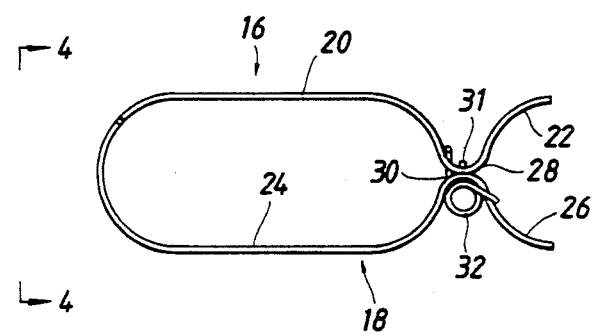
FIG.2
FIG.4
FIG.3
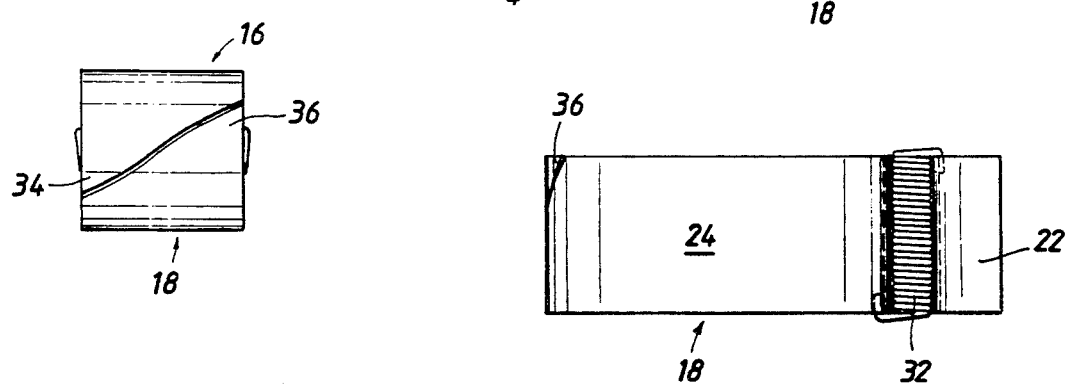
FIG.5
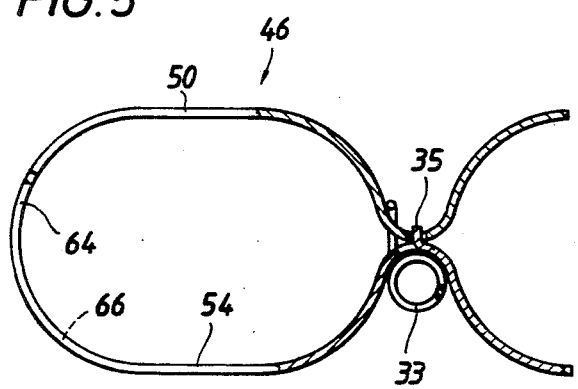
FIG.6
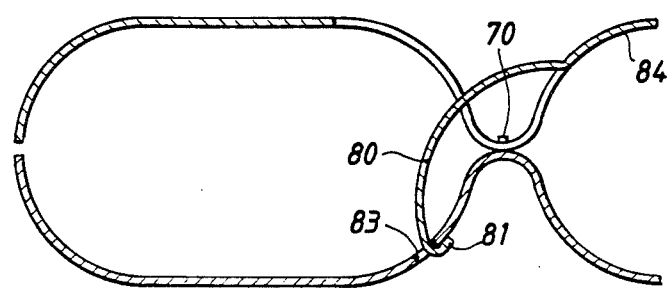

CORD CLASP

BACKGROUND OF THE INVENTION

1. Field of the invention

This invention pertains to apparatus for holding and containing gathered cord and more specifically to apparatus suitable for tidying otherwise unsightly appliance cords.

2. Description of the prior art

It is not uncommon for numerous electrical appliances to be left in the open on countertops in such rooms as kitchens and bathrooms and in such work areas as home shop work benches. Electrical cords can be snugged up to outlets in some cases and become somewhat tidy. In other instances, cords can be tacked neatly to the floor or wall when the appliance base is located some distance from the plug, provided the base is left permanently located in a single place of use.

However, there are many times when neither of the above conditions exist. For example, a hair dryer does not remain on the counter in one location, but is most conveniently picked up for use and placed down when not in use. In order to be put in a condition that is somewhat sightly when not in use, hair dryers are often unplugged all together and put away in a drawer. However, a hair dryer or similar appliance that is put away must be set up again before it can be used in spite of the fact that it is intended to be left plugged in ready for use and merely turned off by its on/off switch.

U.S. Pat. No. 4,742,429, commonly owned, describes a bathroom electrical appliance caddy that accommodates electrical appliances in a cabinet-mounted housing that can be readily slid out of the cabinet when one or more appliances carried therein is ready for use and put away when not in use. However, appliances with long and/or ungainly cords located on one or both shelves of such a caddy are often left in an unsightly condition. The cords are just tossed back onto the housing shelves of the housing before the housing is slid back into the cabinet. Loose cords can subsequently tangle or knock off items from their shelves when subsequently pulled out.

In some installations, cords are purposely curled or retracted. For example, it is common for the handset of a telephone to be connected to its base by a curled cord that tightly winds up when the handset is returned to its cradle. However, most appliances do not come with such curled cords and it is not convenient to replace cords that come with most appliances with such self-policing cords.

Cords have been tidied in the past in many ways by persons not pleased with either the unsightly appearance of such cords or perhaps because unsightly cords can become tangled and therefore potentially hazardous. Tangled cords, for example, that are assumed not to be tangled when tugged can drag undesired items with them. To keep this from happening, long cords have been tied in knots by their users or twist ties have been used to join gathered loops of cords together. Some appliances come with cylindrical clamps that encircle a gathered cord mass to semi-permanently clamp a predetermined number of loops together to foreshorten the cord. None of these methods are particularly useful for gathering and holding cords together in a temporary gather that can be quickly and conveniently subsequently released to allow gathering again in a different manner, for instance with more or less cord loops.

Therefore, it is a feature of the present invention to provide an improved apparatus that can be employed with loosely gathered appliance cords or the like to make them more tidy than they otherwise would be.

It is another feature of the present invention to provide an improved cord clasp that is of little trouble to manipulate and readjust and can be used with almost any appliance cord in common use.

SUMMARY OF THE INVENTION

The apparatus in a preferred embodiment of the present invention includes two substantially identical jaw members pivoted together along a ridge between their respective cord surrounding portions and their handle portions. A spring or other bias means urges the two cord surrounding portions together. The cord surrounding portions are preferably curvilinear and the tips of their front edges curve more than the remainder of their surfaces. The tips are gently rounded and are located at one side of their respective front edges. Since the two jaw members are substantially identical, the two facing cord surrounding portions come together in complementary fashion and at least loosely retain the gathered cord with which they are employed within their grasp even when the thickness of the cords do not allow the surrounding portions to close completely. Squeezing the handle portions together opens the cord surrounding portions to allow the cord to be released or repositioned.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the exemplary embodiments thereof which are illustrated in the drawings, which drawings form a part of this specification. It is to be noted, however, that the appended drawings illustrate only typical preferred embodiments of the invention and are therefore not to be considered limiting of its scope as the invention may admit to other equally effective embodiments.

In the drawings:

FIG. 1 is a pictorial view of a typical appliance having a cord tidied by a cord clasp in accordance with a preferred embodiment of the present invention.

FIG. 2 is an oblique side view of a first preferred embodiment of cord clasp in accordance with the present invention wherein the jaw members thereof have a long, low profile.

FIG. 3 is a bottom view of the embodiment shown in FIG. 2 showing the dimensional relationships of the jaw members.

FIG. 4 is an end view of the embodiment shown in FIG. 2.

FIG. 5 an oblique side view of a second preferred embodiment present invention wherein the jaw members thereof have a more circular profile than the first embodiment for rolling the cord loops together as the clasp is closed.

FIG. 6 is a side view of a third preferred embodiment of the present invention wherein the bias means urging closure is from a portion of one of the jaw members.

DESCRIPTION OF THE PREFERRED EMBODIMENTS

Now referring to the drawings, and first to FIG. 1, an appliance 10, such as a hand-held hair dryer, is shown having an elongated flexible electrical cord 12 attached thereto for plugging into a suitable electrical outlet (not shown). When the appliance is not in use, the cord is looped, folded or otherwise gathered in multiple thicknesses. Because such thicknesses, even when tidy to begin with, tend to separate and spread apart and become untidy because of their resiliency when tightly gathered, a clasp 14 in accordance with the present invention is enclosed about them to retain them in their tidy condition.

A first preferred embodiment of a clasp 14 is shown in FIG. 2. The clasp generally comprises two main parts, namely, first elongated jaw member 16 and second elongated jaw member 18. Typically, jaw members 16 and 18 are configured in plastic, moldable hard rubber or the like in suitable complementary molds in a manner well known in the art. Jaw member 16 is in one piece, but can be considered as comprising cord surrounding portion 20 and handle portion 22. Similarly, jaw member 18 comprises cord surrounding portion 24 and handle portion 26. As shown in FIG. 2, this embodiment has a long, low profile.

Cord surrounding portion 20 and handle portion 22 converge together at internal pivot ridge 28 and cord surrounding portion 24 and handle portion 26 converge together at cooperatively contacting facing pivot ridge 30. A biasing means in the form of a coil spring 32 with suitable lap-over ends in the external surface valleys opposite the internal surface ridges hold the jaw members together. A suitable dog 31 attached to ridge 30 and operating through a hole in ridge 28 can be provided as further security in holding together members 16 and 18. When handles 22 and 26 are squeezed together, cord surrounding portions 20 and 24 separate so that the gathered cord to be clasped or held can be inserted.

Cord surrounding portions 20 and 24 have complementary curvilinear surfaces. However, as noted, the front edge of portion 20 includes a gently pointed tip 34 to one side, which tip can curve more or be more rounded than the remainder of its shape. In like fashion, the front edge of portion 24 includes a gently pointed tip 36 to its side opposite that of tip 34. Also in similar fashion, the surface of portion 24 in the vicinity of tip 36 can be more rounded or curved than the remainder of its surface. It should be noted that since the tips are on a greater arc portion of their respective curves than the remainders of their front edges, it is the tips that provide the initial in-gathering of the cord thicknesses. The tips also ensure that the cord loops are held within the grasp of the clasp more efficiently than if the front edges of portions 20 and 24 had been straight across and with no exaggerated curves, as may be seen from FIG. 4.

As noted above, the shapes of portions 20 and 24 are complementary to provide clasping of cord 12 within its grasp. Most conveniently, portions 20 and 24 can be identically shaped and can even be made from the same mold, if desired. To make the parts identically as shown in FIG. 2, top member 16 is subsequently stamped to form a hole and to remove the dog 31 that was molded in place.

Now referring to FIG. 5, an oblique view of a cord clasp 46 is shown that is similar to cord clasp 16; however, clasp 46 is generally shorter and rounder in profile. This is because cord surrounding portions 50 and 54 of the respective jaw members have a more circular profile that encourages the loops of cord being gathered to roll into the grasp of the jaw members as the handles of the clasp are operated. Again, the two parts are complementary and include tips 64 and 66 (hidden in the side view shown), tip 64 being on one side of jaw member 50 and tip 66 being on the other side of jaw member 54. The two jaw members can be held and biased closed together by a spring such as spring 32 or other equivalent means such as spring 33 that has only one end that extends to overlap member 50. It should be noted that the forward edges do not have to completely shut to encompass the cord loops, although if there are only a few loops, the two edges will come together, at least at one point. Note further that the clasp can conveniently be made from a resilient plastic or metal structure, such as by stamping, if preferred. In such case a dog 35 is made from stamping out a portion of the material in the lower ridge. A hole to accommodate dog 35 is stamped in the upper ridge.

Referring to FIGS. 2 and 5, it will be seen that both clasps are quite broad so as to embrace or enclose a significant portion of each loop. Preferably the width of a clasp is a minimum of 1 inch wide and can be 2 inches wide or greater. For the FIG. 5 embodiment, the width of the cord surrounding portion is substantially as wide as this portion is long.

FIG. 6 shows yet a third embodiment of a suitable clasp in accordance with this invention. In this case the shape is similar to the clasp shown in FIG. 5; however, the clasp is made of resilient metal, such as aluminum or steel. The two jaw members in this case are held together at the ridges by dog 70 in the same or similar manner to that described for FIG. 5 so as to permit pivoting action to occur. A segment 80 is formed by a cutting or stamping action to form a leaf spring depending from handle 84 of the upper jaw member. End 81 of segment 80 is bent over and passed through hole 83 in the lower cord surrounding or jaw member of the clasp to bias the clasp shut when the handles are released. Alternatively, a separate leaf spring can be attached to one handle and bent to contact the other in similar fashion.

While several preferred embodiments of the invention have been described and illustrated, it will be understood that the invention is not limited thereto, since many modifications may be made and will become apparent to those skilled in the art. For example, other suitable pivots or hinges can be used for connecting together the jaw members. Moreover, other bias means for urging the jaw members together can also be employed, if desired.

We claim:

1. A clasp for holding together multiple thicknesses of gathered cord, comprising:
 a first elongated jaw member having a cord surrounding portion and a handle portion,
 a second elongated jaw member having a cord surrounding portion and a handle portion, said second jaw member being pivoted with respect to said first jaw member so that said first jaw member cord surrounding portion and said second jaw member cord surrounding portion are juxtapositioned to open away from one another when said handle portions are squeezed together, said respective front edges of said first and second jaw member cord surrounding portions being angled on opposite sides to respectively gently pointed tips without changing the radius of the surrounding arc, said tips being closely curved more than the remainder of said respective front edges, bias means secured to said first jaw member and said second jaw member to urge closure of said cord surrounding portion of said jaw member with said cord surrounding portion of said second jaw member, and said cord surrounding portions of said first and second jaw members having respectively complementary front edges for retaining the gathered cord within said surrounding portions even when not fully closed.

2. A clasp in accordance with claim 1, wherein substantially all of each of said cord surrounding portions are curvilinear.

3. A clasp in accordance with claim 1, wherein said bias means includes a spring attached to said first and second jaw members.

4. A clasp in accordance with claim 3, wherein said spring is a coil spring with respective ends overlapping said first and second jaw members in the vicinity where said second jaw member is pivoted with respect to said first jaw member.

5. A clasp in accordance with claim 1, wherein at least one of said first and second jaw members are made of resilient material and said bias means includes at least a portion of said resilient material.

6. A clasp in accordance with claim 1, wherein said first jaw member is symmetrically the same as said second jaw member.

7. A clasp in accordance with claim 1, wherein the width of the clasp is at least the same dimension as the length of said cord surrounding portions of said first and second jaw members.

* * * * *